United States Patent Office

2,776,267
Patented Jan. 1, 1957

2,776,267

SPHERICAL PIGMENTS AND METHOD OF PREPARING SAME

Ira Weber, Long Island City, and Julio H. Basto, New York, N. Y., assignors to Interchemical Corporation, New York, N. Y., a corporation of Ohio No Drawing. Application November 17, 1951, Serial No. 256,952

5 Claims. (Cl. 260—21)

The present disclosure refers to a new method of preparing pigments and to a new type of pigments which, because of their spherical shape and consequent nonabrasiveness, are especially useful in intaglio printing, while their transparency, coupled with exceptionally high color stability, offers new possibilities in process and textile printing.

Until now, the general method of making pigments from dyes has been to prepare metal lakes, such as calcium or barium lakes, from the dyestuffs. Unfortunately, the use of such lakes is limited. The heavy metal lakes from acid dyestuffs, such as the Lithol reds, cannot be used in textile printing because of their poor resistance to alkalies and soap. On the other hand, many color lakes are highly abrasive and cannot be used in intaglio inks, because they would scratch the printing plates when the doctor blade is run over them to remove excess ink. One way of reducing abrasiveness is to precipitate the lake on a hydrate. This not only diminishes abrasiveness but helps to improve dispersibility. Other pigments, although they may be nonabrasive, must be absorbed on a hydrate in order to eliminate water-bleed. In any case, there is a serious loss in toner strength when such pigments are dispersed in a vehicle.

There are still other pigments on the market wherein pigment particles are coated by a resin precipitating from an aqueous solution. The most common example is found in rosinated pigments prepared by dispersing a pigment in the aqueous solution of a rosin soap which is then acidified under agitation, whereby the precipitating resin occludes the pigment particles and forms agglomerates or solid masses which are then dried and ground to desired pigment size. One of the weaknesses of this type of pigment is that the rosin reacts with many pigments, causing destruction of the color and another that the rosin is highly soluble in alkali so that soaps often dissolve the resin and cause water-bleed of the dye. In view of the foregoing, many efforts have been directed at finding other surface coatings for pigments which would result in a more adequate tint permanency.

Thus it was found that amino-formaldehyde resins, especially in the heat-treated, insoluble form, exhibit strong affinity for many soluble organic dyes and that commercially useful pigments can be made by dissolving such dyes in resins of this type. It has also been found that pigments can be suspended in solutions of amino-formaldehyde condensates and that, by transforming the condensate into the insoluble resinous phase, the pigment particles are enveloped by the solidifying resin. Drying and subsequent grinding of the agglomerates or solidified masses is required in either case.

We have found an emulsion method of producing resinous pigments in a dispersed system which is not destroyed upon separation and drying of the resulting pigment particles. While these new pigments are superior in several respects to prior known pigments of the same general type, it is the principal advantage of the method that the resulting pigment particles can be made exceptionally uniform in size, that the size of the resulting pigment can be regulated at will within a wide range and that no grinding or milling is required since the dry pigment is obtained as a finely divided, pulverulent product.

In general, the procedure calls for:

(I) Preparing an external phase medium that conforms to the conditions of the procedure in comprising a solvent or solvent mixture which is inert to an amino-formaldehyde resin, is immiscible with water, is of a sufficiently high boiling point to permit heating to the curing temperature of an amino-formaldehyde resin, and preferably, an emulsifying agent miscible with the solvent or solvent mixture in an amount sufficient to stabilize a subsequently added inner phase, (II) Preparing an inner phase medium that conforms to the conditions of the procedure in producing, upon mixing with the external phase medium (I), a stable, uniformly dispersed inner phase comprising an aqueous solution of an uncured, water-soluble amino-formaldehyde condensate, a coloring matter miscible with the aqueous solution and, preferably, an acid resinification catalyst miscible with the aqueous solution, (III) Dispersing so much of the inner phase medium in the external phase medium to produce a stable, water-in-oil type emulsion which does not undergo phase reversion, (IV) Heating the dispersion until the amino-formaldehyde condensate in the discontinuous phase begins to cure to a resin, (V) Continuing the heating to cure the resin further, if necessary at a higher temperature at which the water is driven off as an azeotropic mixture with portions of the outer phase medium, (VI) Separating and drying the resinous pigment.

The external phase medium (I) can be made up with any solvent or solvent mixture that answers the requirements set forth. Thus, numerous fatty acids, ketones, esters, and aliphatic or aromatic hydrocarbons having a boiling point or initial boiling point above 70° C. are suitable for this purpose. More specifically, we prefer the use of aliphatic petroleum distillates, having initial boiling points above 130° C.

To one of the foregoing solvents or a mixture of two or several solvents we add an emulsifying agent in amounts from 0.2 to 10% of the total weight of the emulsion, depending upon the stabilization requirements and the specific action of the emulsifying agent in preventing coalescence of dispersed droplets. Many such emulsifying agents are known and those found suitable comprise various fatty acid esters of polyhydroxy alcohols, alkyds, oil-modified alkyds, ethyl cellulose, sulfonated esters, fatty acid esters of polyoxyethylene-alcohol condensates, glucoside fatty acid esters, fatty acid amides, amido-alcohols, sterols phosphatides, and others.

The internal phase medium (II) is made up most practically by employing an aqueous solution of a previously prepared amino-formaldehyde condensate. The solution may be a true or a colloidal solution. Under amino-formaldehyde condensates we understand reaction products between formaldehyde and a member taken from the group consisting of urea, biuret, thiourea, cyanuric acid, guanidine, guanyl urea, cyanuramide and dicyandiamide. We find prepared amino-formaldehyde condensates specifically useful, although it is just as feasible to start out with the preparation of the desired condensate. The solution should preferably have a concentration ranging from 35 to 65% if the pigment to be produced is to comprise a coloring matter which is soluble in an amino-formaldehyde resin, and 2 to 20% if the pigment is to comprise a coloring matter which is insoluble in the amino-formaldehyde resin.

These water-soluble amino-formaldehyde condensates are amenable to heat-hardening, i. e. they can be transformed into insoluble polymers by means of heating to temperatures ranging from 85° to 165° C. Generally, the lower temperatures require more lengthy heating periods in order to produce an insoluble resin. The rate of curing can be increased if an acid catalyst is added, which may be a mineral acid, a water-soluble organic acid, the ammonium salt of a mineral acid or the ammonium salt of a water-soluble organic acid. We dissolve the catalyst in water, in amounts ranging from 0.2 to 10% of the solids in the amino-formaldehyde solution and add it thereto just prior to the emulsification in order to prevent premature gelation and curing.

To the solution we add, furthermore, a coloring matter which can be a dyestuff, a lake, or a pigment. The amounts added depend entirely upon the purpose and in case of water-soluble dyestuffs are limited in practice by the solubility of the dyestuff in the resulting resin. The preferred amounts range from 0.5 to 20% of the solids in the amino-formaldehyde solution. In case of lakes and pigments which are insoluble in the aqueous solution, we add an amount which in metric units of volume is about four times the metric weight of the condensate solids. We found that, regardless of the fineness of grind of the pigment or lake the resin will then adequately envelop the pigment or lake particles. In order to disperse a pigment or lake in the aqueous amino-formaldehyde condensate, it must be either hydrophilic or must be treated first with a wetting agent, such as analkyl-aryl sulfonic acid, a naphthalene sulfonic acid-formaldehyde condensate or a polyethyleneoxide-alcohol condensate. Inasmuch as pigment dyes can be used in form of pulps or press cakes in conjunction with this procedure, the steps of drying, grinding and redispersing as required for other methods are superfluous here. For most uses, the particle size of the lake or pigment should be from 0.3 $\mu$ to 3 $\mu$, although it can be as high as 100 $\mu$ if the pigment is to be used in paints, lacquers, or silk screen inks.

The internal phase medium (II) is carefully added to the external phase medium (I) and the mixture is triturated in a turbo mixer or a colloid mill. The uniformity of the dispersed droplets, and also their size depends upon the efficiency of emulsification. It is the size of the droplets which subsequently determines the maximum particle size of the resulting pigment.

The emulsion is then agitated and heated, at a temperature ranging from 40° to 99° C., until the resin cures and forms discrete particles within the droplets. The stage at which the resin solidifies is readily observed. In a typical case, after heating the emulsion at 85° to 90° C. for three hours, a very noticeable bodying takes place, which may be either due to a swelling of the droplets or caused by the increase in the number of particles dispersed in the emulsion when the discrete bodies of solidified resin separate out of the aqueous droplets. In order to continue proper mechanical agitation it is sometimes necessary to thin the emulsion at this point by adding more of the external phase medium or of the main constituent of the external phase. The size that the cured particles attain is in most instances 50 to 80 percent the size of the aqueous globules if an amino-formaldehyde solution of, say, 40 percent is used.

Depending upon the type of amino-formaldehyde condensate used, if the resinous particles are separated at this stage and dried, the filtration may be slow, leaving a more or less gelatinous mass which forms agglomerates when dried in the oven, due to insufficient cure. We found, however, that if heating of the emulsion is continued in such instances and the temperature is gradually increased from below 100° C. to a temperature at which the water of the internal phase is driven off in form of an azeotropic mixture with a portion of the external phase constituents, the filtration is rapid and the product, after drying, consists of discrete, free-flowing particles of silky feel. However, even if the resin cures sufficiently at a relatively low temperature and no filtration difficulties are encountered, we find a marked increase in the yield if the temperature is raised and the water is removed.

The resulting pigment particles are of spherical shape whether the pigment consists of a dye solution in the resin or of a minute solid color particle occluded by the resin, regardless of the presence of sharp, angular facings in case of a solid pigment core. Contrary to prior methods of resinating pigments which require comminuting of agglomerates or coherent masses, resulting in irregularly shaped, abrasive particles that often show fading and bleeding of the color, the herein claimed pigments are nonabrasive and have superior color stability. Moreover, because of their spherical shape, they permit a much higher pigment load in paints, varnishes and inks without causing hard caking or impairing flow-characteristics.

The following are typical examples of practicing the invention:

EXAMPLE 1

*External phase medium*

| | Parts by weight |
|---|---|
| Alkyd resin solution—(50% in toluene) | 12 |
| Solvesso 100 | 20 |
| Varsol #2 | 330 |

*Internal phase medium*

| | |
|---|---|
| Melamine-formaldehyde condensate (60% aqueous solution) | 1085 |
| Rhodamine B base (Color Index No. 749) | 9.5 |
| Ammonium sulfate | 14 |

The alkyd resin is a 40% drying oil modified glycerol phthalate.

Solvesso 100 is the trade name of an aromatic hydrocarbon distillate obtained from petroleum by catalytic process, having a boiling range from 156° to 176.5° C.

Varsol #2 is the trade name of a refined petroleum distillate high in aliphatic hydrocarbons, having a boiling range from 158° to 205.5° C.

The internal phase medium is added slowly to the external phase medium while agitating. The mixture is then thoroughly emulsified in a turbo-mixer or a colloid mill and is heated to 85°–90° C. for one hour. After cooling, filtering and drying the residue under partial vacuum for 2½ hours at 60° C., there is obtained 513 parts of a minute, free-flowing pigment of spherical shape which has exceptionally high brilliancy. This pigment has an unusual silky feel and is found to be nonabrasive.

EXAMPLE 2

*External phase medium*

| | Parts by weight |
|---|---|
| Cholestrol | 20 |
| Solvesso 100 | 178 |
| Varsol #2 | 330 |

*Internal phase medium*

| | |
|---|---|
| Urea-formaldehyde condensate (40% aqueous solution) | 1630 |
| Orange II (Color Index No. 151) | 97.5 |
| Ammonium sulfate | 20 |

The internal phase medium is added slowly to the external phase medium while agitating. The mixture is then thoroughly emulsified in a turbo-mixer or a colloid mill and is heated to 90° C. for 3½ hours. After adding 800 parts of Varsol #2, heating is continued at a temperature of 130° C. for 1¼ hours under conditions permitting the removal of all the water in form of an azeotropic mixture with part of the external phase medium. After cooling, filtering and drying the residue under partial vacuum for 2½ hours at 60° C., there is obtained 500 parts of a bright orange pigment, having the general characteristics of the pigment described in Example 1.

Comparable pigments are obtained by substituting thiourea-formaldehyde condensate or biuret-formaldehyde condensate for the urea-formaldehyde condensate.

EXAMPLE 3

*External phase medium*

| | Parts by weight |
|---|---|
| Sorbitan sesquioleate | 25 |
| Solvesso 100 | 178 |
| Varsol #2 | 330 |

*Internal phase medium*

| | |
|---|---|
| Urea-formaldehyde condensate (40% aqueous solution) | 1630 |
| Diamine Sky Blue FF (Color Index No. 518) | 65 |
| Ammonium sulfate | 20 |

The procedure is the same as set forth in Example 2 except that the first heating period is 4 hours. The yield is 532 parts of a transparent blue pigment of the same general characteristics as the pigment described in Example 1.

An identical pigment is obtained by substituting toluol, xylol or ethyl-butylacetate for the Solvesso 100.

EXAMPLE 4

*External phase medium*

| | Parts by weight |
|---|---|
| Polyoxyethylene sorbitan tetraoleate | 15 |
| Solvesso 100 | 178 |
| Varsol #2 | 330 |

*Internal phase medium*

| | |
|---|---|
| Urea-formaldehyde condensate (5% aqueous solution) | 1630 |
| Barium lake of Lithol Red (Lithol Red, Color Index No. 189) | 420 |
| Ammonium sulfate | 4 |

The procedure is identical with that of Example 2 except that the barium lake is to be thoroughly slurried into the condensate solution, preferably with the aid of a non-ionic dispersing agent and that the removal of all the water takes 2½ hours.

There are obtained 482 parts of a red pigment, characterized by greatly improved alkali resistance compared to presently available coated barium Lithol Red lakes.

The same product is obtained if, in lieu of the ammonium sulfate, about 2 parts of citric-, tartaric-, or acetic-acid are used or 4 parts of their ammonium salts, or 1 part of hydrochloric acid or toluene-sulfonic acid.

EXAMPLE 5

*External phase medium*

| | Parts by weight |
|---|---|
| Sotex C | 5 |
| Solvesso 100 | 178 |
| Varsol #2 | 330 |

*Internal phase medium*

| | |
|---|---|
| Iron Blue | 525 |
| Urea-formaldehyde condensate (6% aqueous solution) | 1630 |
| Ammonium sulfate | 20 |

Sotex C is the trade name of an emulsifying agent consisting of amides of lauric acid with long chain amines.

The procedure is the same as that of Example 4. The yield is 599 parts of a blue pigment which has an alkali resistance superior to "alkali resisting" Iron Blue now available.

EXAMPLE 6

*External phase medium*

| | Parts by weight |
|---|---|
| Alkyd resin solution (50% in toluene) | 17.4 |
| Solvesso 100 | 177.6 |
| Varsol #2 | 321.5 |

*Internal phase medium*

| | |
|---|---|
| Urea-formaldehyde condensate (40% aqueous solution) | 1630 |
| Thioflavine T (Color Index No. 815) | 20 |
| Ammonium sulfate | 20 |

The alkyd (identical with the alkyd described in Example 1) is first dissolved in the Solvesso 100 after which the Varsol #2 is added. Specific care is taken in emulsifying the mixture in that samples are taken which are observed under the microscope until the size of the dispersed droplets is uniform and is reduced to an average size of 1 $\mu$. The finished product, of which there is obtained 488 parts, consists of spherical particles having a diameter of 0.6 $\mu$. Because of the uniformity in particle size, the product can be advantageously used as a dispersion standard, in microscopy or in testing dispersion theories.

We claim:

1. The method of producing a spherical pigment which consists in preparing a water-in-oil emulsion by dispersing a colored aqueous solution of a thermosetting aminoplast resin which is a condensate between formaldehyde and a member of the group consisting of urea, biuret, thiourea, cyanuric acid, guanidine, guanyl urea, cyanuramide and dicyandiamide, into a volatile, water-immiscible organic solvent, heating the emulsion while stirring to insolubilize the aminoplast resin the form of dispersed particles and to incorporate the coloring matter therein, separating the said particles from the liquid media and drying them to a free flowing product.

2. The method according to claim 1 wherein the volatile water-immiscible organic solvent contains an emulsifying agent in an amount sufficient to stabilize the emulsion.

3. The method according to claim 1 wherein the dispersed phase comprises an acid resinification catalyst.

4. The method of producing a spherical pigment which consists in preparing a water-in-oil emulsion from one part of a water-immiscible continuous phase medium comprising an approximately two percent solution of a 40 percent drying oil modified glycerol phthalate in a volatile water-immiscible solvent that is inert to an insolubilized melamine-formaldehyde condensate, and about three parts of a dispersed phase medium comprising a 60 percent aqueous solution of melamine-formaldehyde condensate, an aqueously soluble dye in an amount ranging from 0.5 to 20 percent of the solids in the melamine-formaldehyde solution, and an acid resinification catalyst in an amount ranging from 0.2 to 10 percent of the said solids; heating the emulsion while stirring to insolubilize the melamine-formaldehyde condensate in form of dispersed particles and to incorporate the dye therein, cooling, separating the said particles from the liquid medium and drying them to a pulverulent, free-flowing product.

5. The method of producing a spherical pigment which consists in preparing a water-in-oil emulsion from one part of a water-immiscible continuous phase medium comprising an amount of an emulsifying agent ranging from 0.2 to 10 percent of the total weight of the emulsion in a volatile, water-immiscible solvent which is inert to an insolubilized urea-formaldehyde condensate and has a boiling point higher than water, and about three parts of a dispersed phase medium comprising a 40 percent aqueous solution of urea-formaldehyde condensate, Rhodamine B base in an amount equal to about 1.5 percent of the solids in the urea-formaldehyde solution, and ammonium sulfate in an amount equal to about 3 percent of the said solids; heating to about 90° C. for 1½ hours while stirring to at least partly insolubilize the urea-formaldehyde condensate in the form of dispersed particles and to incorporate the dye therein, adding another portion of the continuous phase solvent to facilitate proper agitation, heating to a temperature above the boiling point of water to insolubilize substantially all of the urea-formaldehyde condensate and to remove the water in form of an azeotropic mixture with part of the external phase solvent, cooling, separating the said dispersed particles from the liquid medium and drying them to a pulverulent, free-flowing product.

References Cited in the file of this patent

UNITED STATES PATENTS

| | | |
|---|---|---|
| 2,119,189 | Widmer | May 31, 1938 |
| 2,361,277 | Enderlin et al. | Oct. 24, 1944 |
| 2,525,835 | Schmutzler | Oct. 17, 1950 |
| 2,544,636 | Peck | Mar. 6, 1951 |
| 2,674,587 | Leek | Apr. 6, 1954 |

OTHER REFERENCES

"The Technology of Plastics and Resins," by Mason and Manning, published 1945, page 457.